US00RE50409E

(19) United States
(12) Reissued Patent
Hammarwall et al.

(10) Patent Number: US RE50,409 E
(45) Date of Reissued Patent: Apr. 29, 2025

(54) METHOD AND RADIO NODE FOR ENABLING USE OF HIGH ORDER MODULATION IN A RADIO COMMUNICATION WITH A USER EQUIPMENT

(71) Applicant: Telefonaktiebolaget LM Ericsson (publ), Stockholm (SE)

(72) Inventors: David Hammarwall, Vallentuna (SE); Meng Wang, Sundbyberg (SE)

(73) Assignee: TELEFONAKTIEBOLAGET LM ERICSSON (PUBL), Stockholm (SE)

(21) Appl. No.: 16/698,400

(22) Filed: Nov. 27, 2019

Related U.S. Patent Documents

Reissue of:
(64) Patent No.: 9,831,982
Issued: Nov. 28, 2017
Appl. No.: 15/360,315
Filed: Nov. 23, 2016

U.S. Applications:
(63) Continuation of application No. 14/390,904, filed as application No. PCT/SE2014/050803 on Jun. 26,
(Continued)

(51) Int. Cl.
*H04L 1/00* (2006.01)
*H04W 72/08* (2009.01)
(Continued)

(52) U.S. Cl.
CPC ..... *H04L 1/0005* (2013.01); *H04L 1/0003* (2013.01); *H04L 1/0009* (2013.01);
(Continued)

(58) Field of Classification Search
CPC ... H04L 1/0005; H04L 1/0003; H04L 1/0009; H04L 1/0011; H04L 1/0016;
(Continued)

(56) References Cited

U.S. PATENT DOCUMENTS 7,751,368 B2 * 7/2010 Li ..... H04L 1/0025 370/332
7,848,252 B2 * 12/2010 Choi ..... H04L 25/0222 370/335
(Continued)

FOREIGN PATENT DOCUMENTS

CN 102124693 A 7/2011
CN 102196495 A 9/2011
(Continued)

OTHER PUBLICATIONS

3GPP TS 36.213 V10.3.0 (Sep. 2011),3rd Generation Partnership Project; Technical Specification Group Radio Access Network; Evolved Universal Terrestrial Radio Access (E-UTRA); Physical layer procedures; (Release 10), Valbonne, France. (Year: 2011).*
(Continued)

*Primary Examiner* — David E England
(74) *Attorney, Agent, or Firm* — COATS & BENNETT, PLLC

(57) ABSTRACT

A method and radio node for enabling higher-order modulation in a radio communication with a first UE. A first table configuration comprises at least one of a first Modulation and Coding Scheme, MCS, table and a first Channel Quality Indicator, CQI, table which tables support a certain maximum modulation order. When the radio node detects that a modulation order higher than the maximum modulation order of the first table configuration is potentially possible to use in the radio communication, the radio node instructs the first UE to apply a second table configuration which comprises at least one of a second MCS table and a second CQI table which second tables support the higher modulation order. At least one entry for at least one modulation order in the tables of the first table configuration is maintained in the tables of the second table configuration as a fall-back in case it is desirable to use the at least one modulation order of the
(Continued)

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

first table configuration when the second table configuration is applied. Thereby, a higher data rate can be achieved in the radio communication.

25 Claims, 7 Drawing Sheets

Related U.S. Application Data

2014, now Pat. No. 9,509,440, application No. 16/698,400, filed on Nov. 27, 2019 is a continuation of application No. 16/695,732, filed on Nov. 26, 2019, which is an application for the reissue of Pat. No. 9,831,982, which is a continuation of application No. 14/390,904, filed as application No. PCT/SE2014/050803 on Jun. 26, 2014, now Pat. No. 9,509,440.

(60) Provisional application No. 61/863,935, filed on Aug. 9, 2013.

(51) Int. Cl.
*H04W 72/541* (2023.01)
*H04W 88/02* (2009.01)

(52) U.S. Cl.
CPC ..... *H04L 1/0011* (2013.01); *H04L 1/0016* (2013.01); *H04L 1/0025* (2013.01); *H04L 1/0026* (2013.01); *H04W 72/541* (2023.01); *H04W 88/02* (2013.01); *Y02D 30/50* (2020.08)

(58) Field of Classification Search
CPC .. H04L 1/0025; H04L 1/0026; H04W 72/541; H04W 88/02; Y02D 30/50
See application file for complete search history.

(56) References Cited

U.S. PATENT DOCUMENTS

| | | | | |
|---|---|---|---|---|
| 7,907,958 | B2 | 3/2011 | Sampath et al. | |
| 8,040,912 | B2 | 10/2011 | Imamura et al. | |
| 8,204,144 | B2 | 6/2012 | Takada et al. | |
| 8,385,305 | B1 | 2/2013 | Negus et al. | |
| 8,938,269 | B2 | 1/2015 | Sampath et al. | |
| 9,025,430 | B2 | 5/2015 | Cheng et al. | |
| 9,166,736 | B2 | 10/2015 | Imamura et al. | |
| 9,210,693 | B2 | 12/2015 | Zhang et al. | |
| 9,344,240 | B2 * | 5/2016 | Kim | H04L 5/0046 |
| 9,344,259 | B2 | 5/2016 | Love et al. | |
| 9,379,844 | B2 | 6/2016 | Zhang et al. | |
| 9,509,440 | B2 * | 11/2016 | Hammarwall | H04L 1/0005 |
| 9,544,880 | B2 * | 1/2017 | Song | H04W 72/21 |
| 9,596,052 | B2 * | 3/2017 | Pan | H04L 1/0016 |
| 9,642,118 | B2 * | 5/2017 | Lahetkangas | H04L 1/0003 |
| 9,648,601 | B2 | 5/2017 | Wang et al. | |
| 9,794,022 | B2 | 10/2017 | Xu et al. | |
| 9,831,982 | B2 * | 11/2017 | Hammarwall | H04L 1/0016 |
| 9,832,784 | B2 * | 11/2017 | Einhaus | H04W 72/12 |
| 9,871,618 | B2 * | 1/2018 | Yang | H04L 1/0026 |
| 9,949,289 | B2 * | 4/2018 | Song | H04L 1/0077 |
| 9,973,297 | B2 * | 5/2018 | Marinier | H04W 72/23 |
| 9,973,298 | B2 * | 5/2018 | Xia | H04L 1/0026 |
| 10,079,654 | B2 * | 9/2018 | Xia | H04L 5/0057 |
| 10,097,331 | B2 * | 10/2018 | Chen | H04L 1/0003 |
| 10,103,838 | B2 * | 10/2018 | Yang | H04L 1/0026 |
| 10,455,612 | B2 * | 10/2019 | Song | H04L 1/0026 |
| 10,530,522 | B2 * | 1/2020 | Yang | H04L 1/0025 |
| 10,693,584 | B2 * | 6/2020 | Marinier | H04L 1/0026 |
| 11,309,988 | B2 * | 4/2022 | Marinier | H04L 1/0003 |
| 2006/0287743 | A1 | 12/2006 | Sampath et al. | |
| 2009/0141648 | A1 | 6/2009 | Imamura et al. | |
| 2010/0027595 | A1 | 2/2010 | Takada et al. | |
| 2010/0303052 | A1 | 12/2010 | Visuri et al. | |
| 2011/0235604 | A1 | 9/2011 | Inoue et al. | |
| 2011/0310853 | A1 | 12/2011 | Yin et al. | |
| 2013/0195122 | A1 | 8/2013 | Li | |
| 2013/0250843 | A1 | 9/2013 | Zhou et al. | |
| 2014/0192732 | A1 * | 7/2014 | Chen | H04L 1/003 370/328 |
| 2014/0301306 | A1 * | 10/2014 | Kim | H04L 5/0046 370/329 |
| 2015/0036590 | A1 | 2/2015 | Lahetkangas et al. | |
| 2015/0358111 | A1 | 12/2015 | Marinier et al. | H04L 5/0044 370/329 |
| 2016/0087752 | A1 * | 3/2016 | Xia | H04L 1/0016 370/329 |
| 2017/0012735 | A1 * | 1/2017 | Yang | H04L 1/0025 |
| 2018/0123729 | A1 * | 5/2018 | Yang | H04L 1/0025 |
| 2019/0044644 | A1 * | 2/2019 | Yang | H04L 27/36 |
| 2020/0145127 | A1 * | 5/2020 | Yang | H04L 1/0016 |
| 2022/0116931 | A1 * | 4/2022 | Hwang | H04W 24/10 |

FOREIGN PATENT DOCUMENTS

| | | | |
|---|---|---|---|
| CN | 102422584 | A | 4/2012 |
| CN | 102624481 | A | 8/2012 |
| CN | 102684816 | A | 9/2012 |
| CN | 102771061 | A | 11/2012 |
| CN | 103238289 | A | 8/2013 |
| CN | 103944855 | A | 7/2014 |
| EP | 2787670 | A1 | 10/2014 |
| JP | 2009510804 | A | 3/2009 |
| JP | 2010035032 | A | 2/2010 |
| WO | 2007020994 | A1 | 2/2007 |
| WO | 2013123961 | A1 | 8/2013 |
| WO | 2014029108 | A1 | 2/2014 |
| WO | 2014109915 | A1 | 7/2014 |

OTHER PUBLICATIONS

Hitachi LTD., "Evaluation on 256QAM in small cell scenario", 3GPP TSG-RAN WG1 #73, Fukuoka, Japan, May 20, 2013, pp. 1-5, R1-132266, 3GPP.

He, L., "Application of 256 QAM in LTE-Advanced Standard", Modern Science & Technology of Telecommunications, Dec. 12, 2012, pp. 47-52, China Academic Journal Electronic Publishing House.

CIPO Search Report for CN Application No. 201910179255.1 mailed Jan. 6, 2022, pp. 1-2.

Panasonic, "Discussion on 256QAM for Downlink in Small Cell Deployments", 3GPP TSG-RAN WG1 Meeting 73, Fukuoka, Japan, May 20, 2013, pp. 1-6, R1-132138, 3GPP.

Hitachi LTD., "Discussion on 256QAM in small cell scenarios", 3GPP TSG-RAN WG1 #72bis, Chicago, USA, Apr. 15, 2013, pp. 1-3, R1-131146, 3GPP.

Petition for Inter Partes Review of U.S. Pat. No. 9,509,440 Pursuant to 35 U.S.C §§ 311-319, 37 C.F.R. § 42 mailed Feb. 5, 2021 in re U.S. Pat. No. 9,509,440 issued Nov. 29, 2016, pp. 1-76.

"Declaration of Dr. Apostolos K. Kakaes", Exhibit Samsung-1003 of Petition for Inter Partes Review of U.S. Pat. No. 9,509,440 Pursuant to 35 U.S.C §§ 311-319, 37 C.F.R. § 42 mailed Feb. 5, 2021, pp. 1-98.

"Curriculum Vitae of Dr. Apostolos K. Kakaes" Exhibit Samsung-1004 of Petition for Inter Partes Review of U.S. Pat. No. 9,509,440 Pursuant to 35 U.S.C §§ 311-319, 37 C.F.R. § 42 mailed Feb. 5, 2021, pp. 1-6.

"Declaration of Dr. Jacob L. Mullins", Exhibit Samsung-1010 of Petition for Inter Partes Review of U.S. Pat. No. 9,509,440 Pursuant to 35 U.S.C §§ 311-319, 37 C.F.R. § 42 mailed Feb. 5, 2021, pp. 1-1365.

"Declaration of Dr. Friedhelm Rodermund", Exhibit Samsung-1016 of Petition for Inter Partes Review of U.S. Pat. No. 9,509,440 Pursuant to 35 U.S.C §§ 311-319, 37 C.F.R. § 42 mailed Feb. 5, 2021, pp. 1-21.

Dismissal Prior to Institution of Trial Pursuant to 37 C.F.R. § 42.71(a) mailed Jun. 4, 2021 in re Petition for Inter Partes Review of U.S. Pat. No. 9,509,440, pp. 1-5.

(56) References Cited

OTHER PUBLICATIONS

Petition for Inter Partes Review of U.S. Pat. No. 9,509,440 Pursuant to 35 U.S.C §§ 311-319, 37 C.F.R. § 42 mailed Feb. 1, 2022 in re U.S. Pat. No. 9,509,440 issued Nov. 29, 2016, pp. 1-90.
"Prosecution History of the '440 Patent" Exhibit Apple-1002 of Petition for Inter Partes Review of U.S. Pat. No. 9,509,440 Pursuant to 35 U.S.C §§ 311-319, 37 C.F.R. § 42 mailed Feb. 1, 2022, pp. 1-440.
"Declaration of Dr. Apostolos K. Kakaes", Exhibit Apple-1003 of Petition for Inter Partes Review of U.S. Pat. No. 9,509,440 Pursuant to 35 U.S.C §§ 311-319, 37 C.F.R. § 42 mailed Feb. 1, 2022, pp. 1-101.
"Curriculum Vitae of Dr. Apostolos K. Kakaes" Exhibit Apple-1004 of Petition for Inter Partes Review of U.S. Pat. No. 9,509,440 Pursuant to 35 U.S.C §§ 311-319, 37 C.F.R. § 42 mailed Feb. 1, 2022, pp. 1-6.
Ghosh, A et al., "Fundamentals of LTE", Sep. 10, 2010, pp. 339-344, Pearson Educations, Inc.
Classon, B. et al., "Chapter 10: Link Adaptation and Channel Coding", LTE—The UMTS Long Term Evolution: From Theory to Practice, 2nd Edition, Jul. 1, 2011, pp. 215-248, Wiley.
3rd Generation Partnership Project, "3rd Generation Partnership Project; Technical Specification Group Radio Access Network; Evolved Universal Terrestrial Radio Access (E-UTRA); Physical layer procedures (Release 10)", Technical Specification, 3GPP TS 36.231 V10.3.0, Sep. 1, 2011, pp. 1-122, 3GPP.
Toskala, A. et al., "LTE for UMTS Evolution to LTE-Advanced—Chapters 5 & 6", 2nd Edition, Mar. 1, 2011, pp. 33-184, Wiley.
"Declaration of Dr. Jacob Robert Munford", Exhibit Apple-1014 of Petition for Inter Partes Review of U.S. Pat. No. 9,509,440 Pursuant to 35 U.S.C §§ 311-319, 37 C.F.R. § 42 mailed Feb. 1, 2022, pp. 1-20.
Dahlman, E. et al., "4G LTE / LTE-Advanced for Mobile Broadband", Jan. 1, 2011, pp. 1-447, Elsevier.
"Declaration of Dr. Friedhelm Rodermund", Exhibit Apple-1016 of Petition for Inter Partes Review of U.S. Pat. No. 9,509,440 Pursuant to 35 U.S.C §§ 311-319, 37 C.F.R. § 42 mailed Feb. 1, 2022, pp. 1-40.
"Declaration of Dr. Jacob L. Mullins", Exhibit Apple-1010 of Petition for Inter Partes Review of U.S. Pat. No. 9,509,440 Pursuant to 35 U.S.C §§ 311-319, 37 C.F.R. § 42 mailed Feb. 1, 2022, pp. 1-901.
3rd Generation Partnership Project, "LTE; Evolved Universal Terrestrial Radio Access (E-UTRA); Physical layer procedures (3GPP TS 36.213 version 11.2.0 Release 11)", Technical Specification, ETSI TS 136 213 V11.2.0, Apr. 1, 2013, pp. 1-174, ETSI, France.
Panasonic, "Discussion on 256QAM for Downlink in Small Cell Deployments", 3GPP TSG-RAN WG1 Meeting 72bis, Apr. 15, 2013, pp. 1-6, R1-131328, Chicago, IL, United States.
Huawei, et al., "Standard Impacts to Support Higher Order Modulation", 3GPP TSG-RAN WG1 Meeting 73, May 20, 2013, pp. 1-2, R1-131853, Fukuoka, Japan.
HTC, "On Small Cell Enhancement for improved Spectral Efficiency", 3GPP TSG RAN WG1 Meeting #72, Jan. 28, 2013, pp. 1-4, R1-130311, St. Julian's, Malta.
Intel Corporation, "CQI/MCS/TBS Tables for 256QAM and Relevant Signaling", 3GPP TSG RAN WG1 Meeting #76, Feb. 10, 2014, pp. 1-8, R1-140118, Prague, Czech Republic.

* cited by examiner

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Fig. 3

| MCS Index $I_{MCS}$ | Modulation Order $Q_m$ | TBS Index $I_{TBS}$ |
|---|---|---|
| 0 | 2 | 0 |
| ~~1~~ | ~~2~~ | ~~1~~ |
| ~~2~~ | ~~2~~ | ~~2~~ |
| ~~3~~ | ~~2~~ | ~~3~~ |
| ~~4~~ | ~~2~~ | ~~4~~ |
| ~~5~~ | ~~2~~ | ~~5~~ |
| ~~6~~ | ~~2~~ | ~~6~~ |
| ~~7~~ 1 | 2 | 7 |
| ~~8~~ 2 | 2 | 8 |
| ~~9~~ 3 | 2 | 9 |
| ~~10~~ 4 | 4 | 9 |
| ~~11~~ 5 | 4 | 10 |
| ~~12~~ 6 | 4 | 11 |
| ~~13~~ 7 | 4 | 12 |
| ~~14~~ 8 | 4 | 13 |
| ~~15~~ 9 | 4 | 14 |
| ~~16~~ 10 | 4 | 15 |
| ~~17~~ 11 | 6 | 15 |
| ~~18~~ 12 | 6 | 16 |
| ~~19~~ 13 | 6 | 17 |
| ~~20~~ 14 | 6 | 18 |
| ~~21~~ 15 | 6 | 19 |
| ~~22~~ 16 | 6 | 20 |
| ~~23~~ 17 | 6 | 21 |
| ~~24~~ 18 | 6 | 22 |
| ~~25~~ 19 | 6 | 23 |
| ~~26~~ 20 | 6 | 24 |
| ~~27~~ 21 | 6 | 25 |
| ~~28~~ 22 | 6 | 26 |
| **23** | **8** | **New index** |
| **24** | **8** | **New index** |
| **25** | **8** | **New index** |
| **26** | **8** | **New index** |
| **27** | **8** | **New index** |
| **28** | **8** | **New index** |
| 29 | 2 | reserved |
| 30 | 4 | |
| 31 | 6 | |

Fig. 8

| CQI index | modulation | code rate x 1024 | efficiency |
|---|---|---|---|
| 0 | out of range | | |
| **1** | **QPSK** | **78** | **0.1523** |
| ~~2~~ | ~~QPSK~~ | ~~120~~ | ~~0.2344~~ |
| ~~3~~ | ~~QPSK~~ | ~~193~~ | ~~0.3770~~ |
| 4 | ~~QPSK~~ | ~~308~~ | ~~0.6016~~ |
| ~~5~~ | ~~QPSK~~ | ~~449~~ | ~~0.8770~~ |
| ~~6~~ 2 | QPSK | 602 | 1.1758 |
| ~~7~~ 3 | 16QAM | 378 | 1.4766 |
| ~~8~~ 4 | 16QAM | 490 | 1.9141 |
| ~~9~~ 5 | 16QAM | 616 | 2.4063 |
| ~~10~~ 6 | 64QAM | 466 | 2.7305 |
| ~~11~~ 7 | 64QAM | 567 | 3.3223 |
| ~~12~~ 8 | 64QAM | 666 | 3.9023 |
| ~~13~~ 9 | 64QAM | 772 | 4.5234 |
| ~~14~~ 10 | 64QAM | 873 | 5.1152 |
| ~~15~~ 11 | 64QAM | 948 | 5.5547 |
| **12** | **256QAM** | **New value** | **New value** |
| **13** | **256QAM** | **New value** | **New value** |
| **14** | **256QAM** | **New value** | **New value** |
| **15** | **256QAM** | **New value** | **New value** |

Fig. 9

| $I_{TBS}$ | $N_{PRB}$ | | | | | | | | | |
|---|---|---|---|---|---|---|---|---|---|---|
| | 1 | 2 | 3 | 4 | … | … | … | 108 | 109 | 110 |
| **0** | **16** | **32** | **56** | **88** | **…** | **…** | **…** | **2984** | **2984** | **3112** |
| ~~1~~ | ~~24~~ | ~~56~~ | ~~88~~ | ~~144~~ | ~~…~~ | ~~…~~ | ~~…~~ | ~~4008~~ | ~~4008~~ | ~~4008~~ |
| ~~2~~ | ~~32~~ | ~~72~~ | ~~144~~ | ~~176~~ | ~~…~~ | ~~…~~ | ~~…~~ | ~~4776~~ | ~~4968~~ | ~~4968~~ |
| ~~3~~ | ~~40~~ | ~~104~~ | ~~176~~ | ~~208~~ | ~~…~~ | ~~…~~ | ~~…~~ | ~~6200~~ | ~~6456~~ | ~~6456~~ |
| ~~4~~ | ~~56~~ | ~~120~~ | ~~208~~ | ~~256~~ | ~~…~~ | ~~…~~ | ~~…~~ | ~~7736~~ | ~~7736~~ | ~~7992~~ |
| ~~5~~ | ~~72~~ | ~~144~~ | ~~224~~ | ~~328~~ | ~~…~~ | ~~…~~ | ~~…~~ | ~~9528~~ | ~~9528~~ | ~~9528~~ |
| ~~6~~ | ~~328~~ | ~~176~~ | ~~256~~ | ~~392~~ | ~~…~~ | ~~…~~ | ~~…~~ | ~~11448~~ | ~~11448~~ | ~~11448~~ |
| ~~7~~ 1 | 104 | 224 | 328 | 472 | … | … | … | 12960 | 13536 | 13536 |
| ~~8~~ 2 | 120 | 256 | 392 | 536 | … | … | … | 15264 | 15264 | 15264 |
| ~~9~~ 3 | 136 | 296 | 456 | 616 | … | … | … | 16992 | 16992 | 17568 |
| ~~10~~ 4 | 144 | 328 | 504 | 680 | … | … | … | 19080 | 19080 | 19080 |
| ~~11~~ 5 | 176 | 376 | 584 | 776 | … | … | … | 22152 | 22152 | 22152 |
| ~~12~~ 6 | 208 | 440 | 680 | 904 | … | … | … | 24496 | 24496 | 25456 |
| ~~13~~ 7 | 224 | 488 | 744 | 1000 | … | … | … | 27376 | 28336 | 28336 |
| ~~14~~ 8 | 256 | 552 | 840 | 1128 | … | … | … | 30576 | 31704 | 31704 |
| ~~15~~ 9 | 280 | 600 | 904 | 1224 | … | … | … | 32856 | 34008 | 34008 |
| ~~16~~ 10 | 328 | 632 | 968 | 1288 | … | … | … | 35160 | 35160 | 35160 |
| ~~17~~ 11 | 336 | 696 | 1064 | 1416 | … | … | … | 39232 | 39232 | 39232 |
| ~~18~~ 12 | 376 | 776 | 1160 | 1544 | … | … | … | 42368 | 43816 | 43816 |
| ~~19~~ 13 | 408 | 840 | 1288 | 1736 | … | … | … | 46888 | 46888 | 46888 |
| ~~20~~ 14 | 440 | 904 | 1384 | 1864 | … | … | … | 51024 | 51024 | 51024 |
| ~~21~~ 15 | 488 | 1000 | 1480 | 1992 | … | … | … | 55056 | 55056 | 55056 |
| ~~22~~ 16 | 520 | 1064 | 1608 | 2152 | … | … | … | 59256 | 59256 | 59256 |
| ~~23~~ 17 | 552 | 1128 | 1736 | 2280 | … | … | … | 61664 | 61664 | 63776 |
| ~~24~~ 18 | 584 | 1192 | 1800 | 2408 | … | … | … | 66592 | 66592 | 66592 |
| ~~25~~ 19 | 616 | 1256 | 1864 | 2536 | … | … | … | 68808 | 68808 | 71112 |
| ~~26~~ 20 | 712 | 1480 | 2216 | 2984 | … | … | … | 75376 | 75376 | 75376 |
| 21 | NV | NV | NV | NV | … | … | … | NV | NV | NV |
| 22 | NV | NV | NV | NV | … | … | … | NV | NV | NV |
| 23 | NV | NV | NV | NV | … | … | … | NV | NV | NV |
| 24 | NV | NV | NV | NV | … | … | … | NV | NV | NV |
| 25 | NV | NV | NV | NV | … | … | … | NV | NV | NV |
| 26 | NV | NV | NV | NV | … | … | … | NV | NV | NV |

Fig. 10

METHOD AND RADIO NODE FOR ENABLING USE OF HIGH ORDER MODULATION IN A RADIO COMMUNICATION WITH A USER EQUIPMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a continuation reissue of U.S. application Ser. No. 16/695,732, filed on Nov. 26, 2019, which is an application for reissue of U.S. Pat. No. 9,831,982, issued Nov. 28, 2017, which resulted from U.S. application Ser. No. 15/360,315, filed Nov. 23, 2016, which* is a continuation *application* of U.S. [patent] application Ser. No. 14/390,904, filed Oct. 6, 2014 *and issued as U.S. Pat. No. 9,509,440 on Nov. 29, 2016*, which is the National Stage of International Application No. PCT/SE2014/050803, filed Jun. 26, 2014, which claims the benefit of U.S. Provisional Application *Serial No.* 61/863,935, filed Aug. 9, 2013, the disclosures of each of which are incorporated herein by reference in their entirety.

TECHNICAL FIELD

The present disclosure relates generally to a radio node of a cellular network, a User Equipment, UE and methods therein, for enabling use of a high order modulation when communicating radio signals.

BACKGROUND

In this field, the term "User Equipment, UE" is commonly used and will be used in this disclosure to represent any wireless terminal or device capable of radio communication with a cellular network including receiving downlink signals transmitted from a serving radio node and sending uplink signals to the radio node. For example, the term User Equipment, UE could be exchanged by the term "wireless device". Further, the term "radio node", also commonly referred to as a base station, e-nodeB, eNB, etc., represents any node of a cellular network that can communicate uplink and downlink radio signals with UEs. The radio nodes described here may, without limitation, include so-called macro nodes and low power nodes such as micro, pico, femto, Wifi and relay nodes, to mention some customary examples. Throughout this disclosure, the term "eNB" is often used but can be exchanged by the term radio node.

Link adaptation in systems according to Long Term Evolution, LTE, is based on adaptive modulation and coding, which controls data rate by adaptively adjusting the modulation scheme and/or channel coding rate according to the radio-link conditions. In this procedure, the Modulation and Coding Scheme, MCS, adopted for Physical Downlink Shared Channel, PDSCH, transmission must be indicated in downlink MCS signaling by the serving radio node to the UE. By uplink signaling, the UE informs the radio node about corresponding radio-link, i.e. channel, conditions through Channel Quality Indicator, CQI signaling, including sending CQI reports to the radio node.

This is generally illustrated in FIG. 1 in which a radio node 100 of a cellular network is serving two UEs denoted UE1 and UE2. In this example, UE1 and UE2 both report quality measurements made on the channel used by sending CQI reports to the radio node 100 which selects a suitable MCS for each UE based on their CQI reporting and signals the selected MCS to the UEs, respectively. Link adaptation is made in this way for individual UEs on a dynamic basis since the radio-link conditions may change rapidly. The selection of a suitable MCS can thus be made individually for each UE.

In current LTE systems, the set of available modulation schemes for both downlink and uplink includes Quadrature Phase-Shift Keying, QPSK, 16 Quadrature Amplitude Modulation, QAM, and 64QAM, corresponding to two, four and six bits carried per modulation symbol, respectively. In this field, the number of bits carried per modulation symbol is usually referred to as the modulation order, $Q_m$.

In brief, the serving radio node selects a suitable MCS based on CQI reporting from the UE and signals the selected MCS to the UE with reference to a predefined MCS index table which is known to the UE. The MCS index table maps MCS indices to modulation order and a Transport Block Size, TBS, index. Further, the UE determines a CQI value based on signal measurements and the CQI is signaled from the UE to the radio node with reference to a likewise predefined CQI index table which maps CQI indices to modulation forms and code rates. In this description, the term "modulation form" is used for short to indicate a modulation format, method or scheme.

In LTE, especially for scenarios with good channel conditions where the Signal-to-Interference-and-Noise Ratio, SINR, is high, e.g. in small-cell environments where the UE is close to its serving radio node, a straightforward means to provide higher data rate for the UE with given transmission bandwidth is to use higher-order modulation that allows for more bits of information to be carried per modulation symbol, as compared to the modulation schemes mentioned above where the highest possible data rate is provided by 64QAM carrying six bits per modulation symbol. However, it is a problem that the control signaling schemes, methods, formats or protocols of today do not support any modulation with higher order than six bits per symbol, as in 64QAM. It is also a problem that additional control signaling would be required between the UE and the serving radio node if higher data rate is to be achieved by using higher-order modulation.

SUMMARY

It is an object of embodiments described herein to address at least some of the problems and issues outlined above. It is possible to achieve this object and others by using a radio node, a UE and methods therein as defined in the attached independent claims.

According to one aspect, a method is performed by a radio node of a cellular network. The radio node is operable to apply a first table configuration in radio communications with User Equipments, UEs, the first table configuration comprising at least one of a first Modulation and Coding Scheme, MCS, table and a first Channel Quality Indicator, CQI, table wherein the at least one of the first MCS table and the first CQI table support a certain maximum modulation order.

In this method, the radio node detects that a higher modulation order which is higher than the maximum modulation order of the first table configuration is potentially possible to use in a radio communication between the radio node and a first UE. The radio node then instructs the first UE to apply a second table configuration in the radio communication. The second table configuration comprises at least one of a second MCS table and a second CQI table wherein the at least one of the second MCS table and the second CQI table support the higher modulation order. Furthermore, at least one entry for at least one modulation order in the at least one of the first MCS table and the first CQI table is maintained in the at least one of the second MCS table and the second CQI table as a fall-back in case it is desirable to use the at least one modulation order in the at least one of the first MCS table and the first CQI table when the second table configuration is applied.

According to another aspect, a radio node of a cellular network is operable to apply a first table configuration in radio communications with User Equipments, UEs, the first table configuration comprising at least one of a first Modulation and Coding Scheme, MCS, table and a first Channel Quality Indicator, CQI, table wherein the at least one of the first MCS table and the first CQI table support a certain maximum modulation order. The radio node comprises a logic unit configured to detect that a higher modulation order which is higher than the maximum modulation order of the first table configuration is potentially possible to use in a radio communication between the radio node and a first UE.

The radio node also comprises an instructing unit configured to instruct the first UE to apply a second table configuration in the radio communication, the second table configuration comprising at least one of a second MCS table and a second CQI table wherein the at least one of the second MCS table and the second CQI table support the higher modulation order. At least one entry for at least one modulation order in the at least one of the first MCS table and the first CQI table is maintained in the at least one of the second MCS table and the second CQI table as a fall-back in case it is desirable to use the at least one modulation order in the at least one of the first MCS table and the first CQI table when the second table configuration is applied.

According to another aspect, a method is performed by a User Equipment, UE, being operable to apply a first table configuration in a radio communication with a radio node of a cellular network. The first table configuration comprises at least one of a first Modulation and Coding Scheme, MCS, table and a first Channel Quality Indicator, CQI, table wherein the at least one of the first MCS table and the first CQI table support a certain maximum modulation order. In this method, the UE receives an instruction from the radio node to apply a second table configuration in the radio communication, the second table configuration comprising at least one of a second MCS table and a second CQI table wherein the at least one of the second MCS table and the second CQI table support a higher modulation order which is higher than the maximum modulation order of the first table configuration. The UE further applies the second table configuration in the radio communication with the radio node.

According to another aspect, a User Equipment, UE, is operable to apply a first table configuration in a radio communication with a radio node of a cellular network, the first table configuration comprising at least one of a first Modulation and Coding Scheme, MCS, table and a first Channel Quality Indicator, CQI, table wherein the at least one of the first MCS table and the first CQI table support a certain maximum modulation order. The UE comprises a communication unit which is configured to receive an instruction from the radio node to apply a second table configuration in the radio communication, the second table configuration comprising at least one of a second MCS table and a second CQI table wherein the at least one of the second MCS table and the second CQI table support a higher modulation order which is higher than the maximum modulation order of the first table configuration. The UE also comprises a logic unit which is configured to apply the second table configuration in the radio communication with the radio node.

When using any of the above methods and nodes, it is possible to achieve a higher data rate in the radio communication between the radio node and the UE by using the higher modulation order of the second table configuration, e.g. when the radio or channel conditions are favorable, instead of being limited to the maximum modulation order of the first table configuration.

A computer program is also provided comprising instructions which, when executed on at least one processor, cause the at least one processor to carry out either of the above methods. A carrier is also provided which contains the above computer program, wherein the carrier is one of an electronic signal, optical signal, radio signal, or computer readable storage medium.

The above methods and nodes may be configured and implemented according to different optional embodiments to accomplish further features and benefits, to be described below.

BRIEF DESCRIPTION OF THE DRAWINGS

The solution will now be described in more detail by means of exemplary embodiments and with reference to the accompanying drawings, in which:

FIG. 3 is a table used for CQI signaling from a UE to a radio node, according to the first table configuration.

FIG. 8 is an example of a modified table used for MCS signaling from a radio node to a UE, [according to] according to a second table configuration.

FIG. 9 is an example of a modified table used for CQI signaling from a UE to a radio node, according to the second table configuration.

FIG. 10 is an example of a modified table used for mapping a Transport Block Size, TBS, index to a data rate, according to further possible embodiments.

DETAILED DESCRIPTION

In this solution it has been recognized that the above-described control signaling for MCS and CQI indication can be re-designed in order to adopt higher-order modulation schemes in LTE systems. In particular, the MCS and CQI index tables used for such signaling can be modified such that the current maximum modulation order can be increased without requiring any extra signaling bits. In this disclosure, the term higher-order modulation may refer to modulation schemes that are higher than 64QAM, such as e.g. 256QAM allowing eight bits per symbol, or even higher modulation of 512QAM, and so forth.

Figures 1, 2:
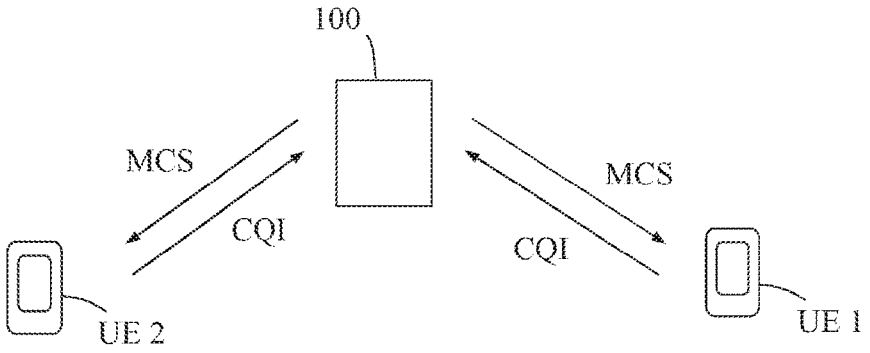
Fig. 1 (Prior art)
FIG. 1 is a communication scenario illustrating how link adaptation can be achieved, according to the prior art.
FIG. 2 is a table used for MCS signaling from a radio node to a UE, according to a first table configuration.

Briefly described, a first table configuration is initially applied in radio communication between a radio node and a UE. The first table configuration comprises a first MCS table and/or a first CQI table which tables support a certain maximum modulation order, e.g. 6. An example of the first MCS table is shown in FIG. 2 and an example of the first CQI table is shown in FIG. 3. The first MCS table and the first CQI table are thus predefined and known to the UE, for example the tables currently used in LTE for signaling between radio nodes and UEs for enabling link adaptation as described above although other MCS and CQI tables are also possible to use in the first table configuration. In these examples it can be seen that the maximum modulation order supported by the first MCS table and the first CQI table is $Q_m$=6 which corresponds to 64QAM.

When detecting that a higher modulation order which is higher than the maximum modulation order of the first table configuration is potentially possible to use in the above communication, e.g. based on CQI reports from the UE, the radio node instructs the UE to apply a second table configuration that supports the higher modulation order. The second table configuration comprises a second MCS table and/or a second CQI table having additional entries that support the higher modulation order. Examples of how such tables of the second table configuration can be configured will be described in more detail later below. In this solution, at least one entry for at least one modulation order is maintained, i.e. kept, from the table(s) of the first table configuration as a fall-back in case it would become desirable or even necessary to use the least one modulation order of the first table configuration when the second table configuration is applied, such as when the radio conditions get worse and only the least one modulation order of the first table configuration, e.g. the lowest modulation order, is possible to use for keeping the radio connection.

It will now be described how link adaptation can be achieved in general according to LTE.

For downlink data transmission in LTE, the radio node typically selects the MCS depending on the CQI feedback transmitted by the UE in the uplink, as illustrated in FIG. 1. The CQI feedback indicates the present channel condition and possible data rate, or more specifically a modulation and coding scheme MCS, that can be supported by the downlink channel given the present channel condition and UE receiver.

The LTE specifications are designed to provide signaling between the radio node and the UE. In the downlink, the information about the MCS adopted for PDSCH transmission is indicated by a five-bit field in the Downlink Control Information, DCI, transmitted from the radio node to the UE. This MCS field corresponds to the MCS index table shown in FIG. 2. In this table, there is room for 32 combinations or entries, where 29 entries are used to signal an adopted MCS, each entry corresponding to a modulation order and a Transport Block Size, TBS, while 3 entries are reserved, e.g., to support adaptive retransmissions. All possible TBS can be described by a TBS table mapping a TBS index, $I_{TBS}$, and an allocation bandwidth into the corresponding transport block size (in bits).

In the uplink, the UE reports CQI to assist the serving radio node to select the appropriate MCS to apply for downlink transmissions. Typically, the CQIs are derived from measurements made by the UE on downlink reference signals transmitted by the serving radio node. For example, the reported CQI may represent the highest MCS that is supported for a PDSCH transmission, e.g. with a transport block error rate probability not exceeding 10%. The CQI is signaled from the UE to the radio node with reference to a predefined CQI index table, as shown in FIG. 3. A 4-bit CQI value corresponds to a particular MCS out of 16 combinations corresponding to CQI index 0-15 in the CQI index table. It should be noted that the CQI table is parameterized in terms of coding rate, as opposed to transport block size. Thus, the selected and signaled CQI indicates the highest modulation and coding rate at which the block error rate measured at UE does not exceed 10%. Based on the CQI feedback from the UE and other information, the radio node is able to select a proper MCS index from the MCS table and notify the UE accordingly by MCS signaling.

Current LTE systems support three modulation schemes for both downlink and uplink: QPSK, 16QAM and 64QAM. Accordingly, the MCS index table, the CQI index table and the corresponding fields for indication in DCI are designed for these three modulation schemes. However, higher-order modulation schemes are not supported in current LTE specifications. In order to support higher-order modulation, i.e. higher than the above schemes QPSK, 16QAM and 64QAM, UEs must support an additional MCS/CQI table that also includes specific entries for new modulation schemes. The modification of MCS/CQI table may require re-designing the DCI format and possibly also the Uplink Control Information, UCI, format.

Typically, the additional MCS/CQI tables are used in scenarios with high Signal-to-Noise Ratio, SNR, or SINR which allow for higher-order modulation to be used thanks to the high signal quality. In scenarios with relatively low SNR or SINR, on the other hand, the current MCS/CQI tables supporting QPSK, 16QAM and 64QAM are useful to achieve link robustness. Hence, a solution has been devised with flexibility to adopt appropriate MCS/CQI tables based on channel conditions as follows.

As mentioned above, current LTE systems only support modulation up to 64QAM, while it may be desirable to use higher-order modulation, e.g. 256QAM, to increase the data rate when the signal quality allows. To support higher-order modulation, adaptations and/or extensions to the current control signaling in terms of the MCS index table, the CQI index table and the corresponding fields in DCI/UCI are required. This can be solved by the embodiments described herein.

In this disclosure, an alternative design of an MCS index table and/or of a CQI index table supporting higher-order modulation is described which can be used for LTE systems, which can be supported in addition to basic MCS and CQI tables such as the current design of the MCS index table and the CQI index table shown in FIG. 2 and FIG. 3, respectively.

In the current LTE specification, the MCS and CQI tables support modulation schemes up to 64QAM, e.g. as illustrated in FIGS. 2 and 3. The proposed new MCS and CQI index tables are able to support modulation higher than 64QAM, without necessarily extending the number of bits in the DCI/UCI formats, or the number of entries in the MCS table and in the CQI table, respectively. In this solution, it is possible to select higher-order modulation schemes e.g. in the high-SINR scenarios or generally when a performance related parameter, such as SINR, of signals communicated between a radio node and a UE is above a certain threshold.

In the new MCS/CQI tables, new entries for higher-order modulation are added and designed to provide sufficient resolution to cover the high-SINR region. Meanwhile, a large part of the existing entries in current MCS and/or CQI tables may be preserved. The current MCS and/or CQI tables may be comprised in a first table configuration while the new MCS and/or CQI tables supporting a higher-order modulation may be comprised in a second table configuration. This has the advantage that the number of new MCS/CQI formats a UE and a radio node has to implement may be minimized. In other words, the UE and the radio node need to support only one extra MCS table and/or CQI table of the second table configuration in order to enable the higher-order modulation.

In a possible embodiment, at least one MCS entry, e.g. the lowest MCS entry with MCS index 0, in the MCS table and/or at least one CQI entry, e.g. the lowest CQI entry for the lowest coding rate of the lowest modulation order with CQI index 1, in the CQI table is preserved or maintained from the basic MCS and/or CQI table, to ensure proper communication between the radio node and the UE under poor channel or radio conditions. Thus, a fallback is provided in case it is only possible or desirable to use a modulation order lower than the higher modulation order, e.g. the lowest modulation order, when the second table configuration is applied. This provides flexibility and robustness in case of changing channel or radio conditions, and provides a robust format to, for example, signal control-plane data, and/or to reconfigure the UE to assume the basic MCS and/or CQI table suitable for poor/normal channel or radio conditions. By employing embodiments described herein, the link adaption in LTE systems may be enhanced to support higher-order modulation schemes, which can significantly improve the spectral efficiency e.g. in high SINR scenarios, while maintaining robustness in case of worsening radio conditions.

It should be noted that although terminology from 3GPP LTE is used in this disclosure to describe various exemplifying embodiments, this should not be seen as limiting the scope of usage to only the aforementioned system. Other wireless systems, including WCDMA, WiMAX, and Ultra Mobile Broadband, UMB, may also benefit from exploiting embodiments described herein.

It should also be noted that terminology such as radio node should be considered non-limiting and in general "radio node" could be considered as device 1 and "UE" could be considered as device 2 and these two devices may communicate with each other over some radio channel in the manner described herein.

In the following, the solution will be explained in more detail by some exemplary embodiments. It should be noted that these embodiments are not mutually exclusive. Components from one embodiment may be utilized in another embodiment wherever appropriate.

The MCS index table and CQI index table used in current LTE specification are shown in FIG. 2 and FIG. 3, respectively. A possible design of alternative MCS and CQI index tables will now be described as well as the mechanism by which the radio node and the UE can switch between the proposed new MCS/CQI tables of the second table configuration and the MCS/CQI tables of the first table configuration. It should be noted that the solution is not limited to the specific examples of MCS/CQI tables described herein and that any MCS/CQI tables may be used in accordance with the embodiments described herein.

Figure 4:
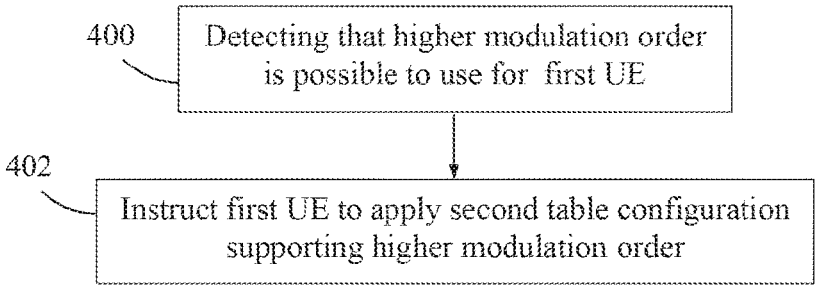
FIG. 4 is a flow chart illustrating a procedure in a radio node, according to some possible embodiments.

An example of a procedure, performed by a radio node of a cellular network when the solution is employed, will now be described with reference to the flow chart in FIG. 4. Some possible but non-limiting embodiments will also be described which may be used for the radio node. In this procedure, it is assumed that the radio node is operable to apply a first table configuration in radio communications with UEs, and that the first table configuration comprises at least one of a first MCS table and a first CQI table wherein the at least one of the first MCS table and the first CQI table support a certain maximum modulation order. As said above, the maximum modulation order supported by the currently used MCS/CQI tables is $Q_m=6$ which corresponds to 64QAM, and the currently used MCS/CQI tables may, without limitation, be used as the first table configuration in this solution.

A first action 400 illustrates that the radio node detects that a higher modulation order which is higher than the maximum modulation order of the first table configuration is potentially possible to use in a radio communication between the radio node and a first UE. For example, this may be detected when a performance related parameter, e.g. SINR, of signals communicated between the radio node and the second UE is above a certain threshold.

Another action 402 illustrates that the radio node instructs the first UE to apply a second table configuration in the radio communication. The second table configuration comprises at least one of a second MCS table and a second CQI table wherein the at least one of the second MCS table and the second CQI table support the higher modulation order. Furthermore, at least one entry for at least one modulation order in the at least one of the first MCS table and the first CQI table is maintained in the at least one of the second MCS table and the second CQI table as a fall-back in case it is desirable to use the at least one modulation order in the at least one of the first MCS table and the first CQI table when the second table configuration is applied. In other words, the at least one of the second MCS table and the second CQI table includes at least one entry for at least one modulation order, e.g. the lowest modulation order, that is also included in the at least one of the first MCS table and the first CQI table, in order to provide said fall-back. Such a fall-back may be desirable, and even necessary, if the signal quality, e.g. as indicated by the CQI reports from the UE, suddenly deteriorates and no modulation order higher than the lowest one is suitable or even possible to use for achieving robustness.

In a possible embodiment, the radio node may instruct the first UE to apply the second table configuration in the radio communication between the radio node and the first UE when a performance related parameter of signals communicated between the radio node and the first UE is above a threshold. The performance related parameter may be derived from CQI reports provided by the first UE containing measurements of downlink reference signals transmitted by the radio node.

In another possible embodiment, the radio node may instruct a second UE to apply the first table configuration in a radio communication between the radio node and the second UE when the performance related parameter of signals communicated between the radio node and the second UE is below the threshold. In yet a possible embodiment, the radio node may in this case instruct the second UE explicitly by sending an instruction to the second UE to apply the first table configuration, or implicitly by not sending an instruction to the second UE to apply the second table configuration which indicates to the second UE that it should apply the first table configuration. Furthermore, the radio node may instruct the first UE as well to apply the first table configuration again, if the performance related parameter of signals between the radio node and the first UE would fall below the threshold. In either of the latter embodiments, the performance related parameter may comprise a Signal-to-Interference-and-Noise Ratio, SINR.

It was mentioned above that the MCS and CQI index tables of the second table configuration may be created by modifying the MCS and CQI index tables of the first table configuration, e.g. the tables shown in FIGS. 2 and 3, such that the current maximum modulation order can be increased. This may be done without requiring any extra signaling bits. In one possible embodiment, the at least one of the second MCS table and the second CQI table may be a modification of the at least one of the first MCS table and the first CQI table, respectively, where a set of entries for the higher modulation order have been added and a set of entries for the at least one modulation order in the at least one of the first MCS table and the first CQI table have been removed in the respective second tables. In another possible embodiment, the at least one modulation order in the at least one of the first MCS table and the first CQI table may comprise a lowest modulation order of the first table configuration. It will be described later below how the above-mentioned modification of the first MCS table and the first CQI table may be done in more detail with reference to examples shown in FIGS. 8 and 9.

It was also mentioned above that at least one entry for the at least one modulation order, e.g. the lowest modulation order, in the at least one of the first MCS table and the first CQI table is maintained, i.e. kept, in the at least one of the second MCS table and the second CQI table as a fall-back in case the signal quality deteriorates while using the second table configuration. In another possible embodiment, the first entry for the lowest modulation order in the first MCS table may be maintained in the second MCS table as the fall-back, and an entry for the lowest coding rate of the lowest modulation order in the first CQI table may be maintained in the second CQI table as the fall-back. This embodiment will be illustrated in more detail later below.

In another possible embodiment, the number of added entries for the higher modulation order and the number of removed entries for the lowest modulation order may be equal such that the first and second MCS tables are of equal size and/or the first and second CQI tables are of equal size. Thereby, no extra bits are needed in the signaling of MCS and/or CQI, respectively, for supporting the second table configuration in addition to the first table configuration.

In another possible embodiment, the at least one of the second MCS table and the second CQI table may be a modification of the at least one of the first MCS table and the first CQI table, respectively, where all entries of the at least one of the first MCS table and the first CQI table have been maintained, i.e. kept, in the at least one of the second MCS table and the second CQI table and a set of entries for the higher modulation order have been added. In yet a possible embodiment, the first and second table configurations may further comprise a Transport Block Size, TBS, table corresponding to the first and second MCS tables, respectively. The TBS table maps a TBS index, $I_{TBS}$, and an allocation bandwidth into the corresponding transport block size, e.g. given in number of bits.

Figure 5:
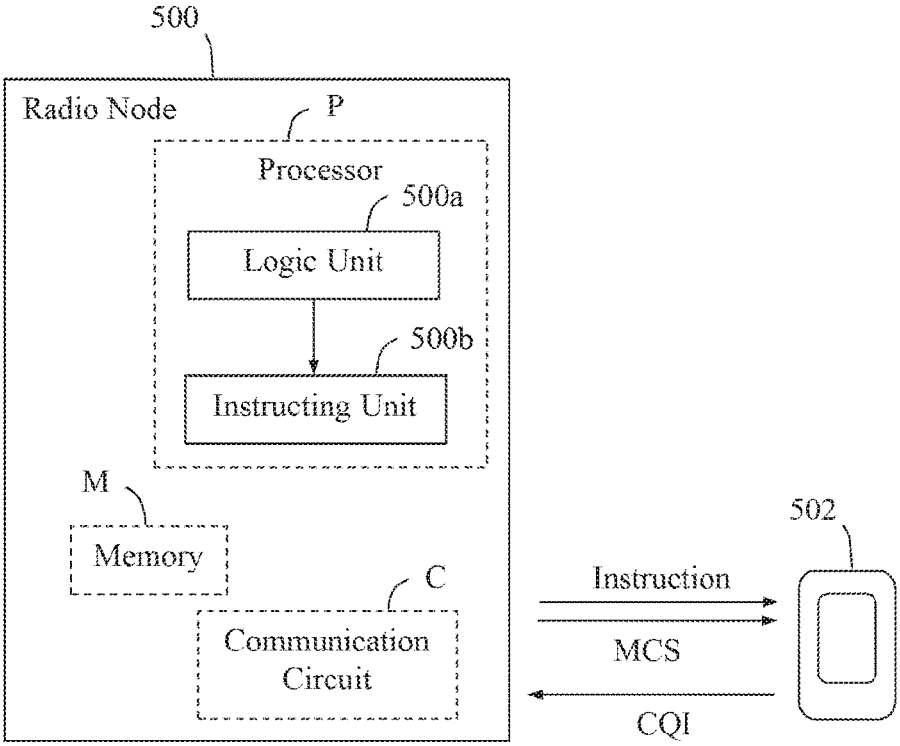
FIG. 5 is a block diagram illustrating an example of how a radio node may be configured and operate, according to further possible embodiments.

A detailed but non-limiting example of how a radio node may be structured with some possible functional entities such as modules, circuits or units, to bring about the above-described functionality of the radio node, is illustrated by the block diagram in FIG. 5. In this figure, the radio node 500 is operable to apply a first table configuration in radio communications with UEs, the first table configuration comprising at least one of a first Modulation and Coding Scheme, MCS, table and a first Channel Quality Indicator, CQI, table wherein the at least one of the first MCS table and the first CQI table support a certain maximum modulation order.

The radio node 500 may be configured to operate according to any of the examples and embodiments of employing the solution as described above and as follows. In particular, the radio node 500 may comprise means arranged or configured to perform the actions of the flow chart in FIG. 4 and the embodiments described above, where appropriate. In order to put any of this into practice, the radio node 500 may be implemented with a communication circuit C, a memory M and an operable processor P comprising various functional units as described below.

More specifically, the radio node 500 comprises means, such as a logic unit 500a, configured to detect that a higher modulation order which is higher than the maximum modulation order of the first table configuration is potentially possible to use in a radio communication between the radio node 500 and a first UE 502. This detecting operation may be performed as described for action 400 above.

The radio node 500 also comprises means, such as an instructing unit 500b, configured to instruct the first UE 502 to apply a second table configuration in the radio communication, the second table configuration comprising at least one of a second MCS table and a second CQI table wherein the at least one of the second MCS table and the second CQI table support the higher modulation order, and wherein at least one entry for at least one modulation order in the at least one of the first MCS table and the first CQI table is maintained in the at least one of the second MCS table and the second CQI table as a fall-back in case it is desirable to use the at least one modulation order in the at least one of the first MCS table and the first CQI table when the second table configuration is applied. This instructing operation may be performed as described for action 402 above.

Figure 6:
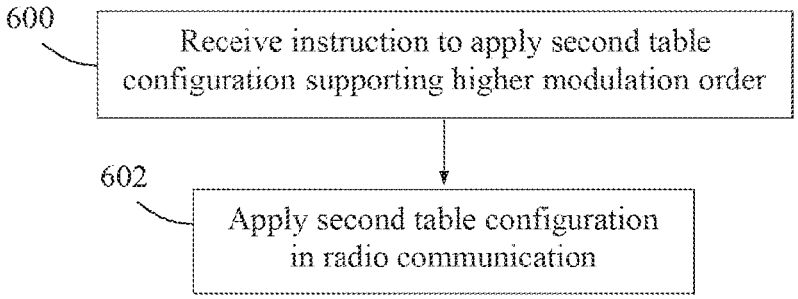
FIG. 6 is a flow chart illustrating a procedure in a UE, according to some possible embodiments.

An example of a procedure, performed by a UE when the solution is employed, will now be described with reference to the flow chart in FIG. 6. In this procedure, it is assumed that the UE is operable to apply a first table configuration in a radio communication with a radio node of a cellular network, the first table configuration comprising at least one of a first Modulation and Coding Scheme, MCS, table and a first Channel Quality Indicator, CQI, table wherein the at least one of the first MCS table and the first CQI table support a certain maximum modulation order.

A first action 600 illustrates that the UE receives an instruction from the radio node to apply a second table configuration in the radio communication, the second table configuration comprising at least one of a second MCS table and a second CQI table wherein the at least one of the second MCS table and the second CQI table support a higher modulation order which is higher than the maximum modulation order of the first table configuration. In another action 602, the UE applies the second table configuration in the radio communication with the radio node, which may include receiving MCS signaling from the radio node with reference to the second MCS table and/or sending CQI reports to the radio node with reference to the second CQI table, in accordance with the second table configuration.

Figure 7:
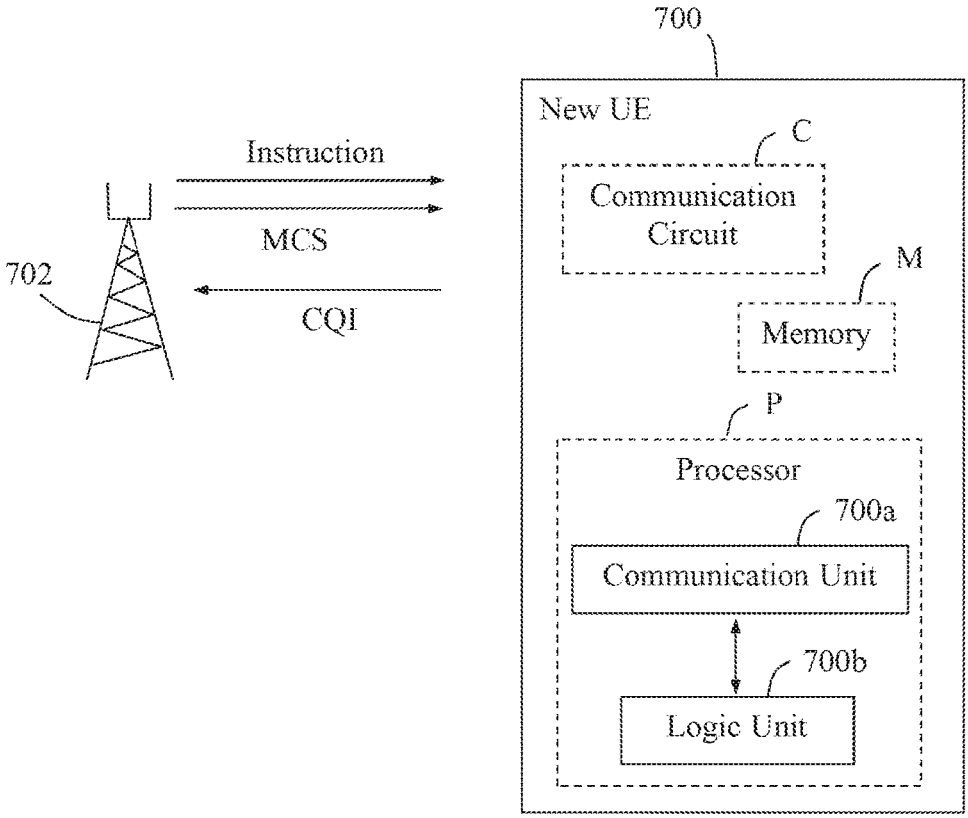
FIG. 7 is a block diagram illustrating an example of how a UE may be configured and operate, according to further possible embodiments.

A detailed but non-limiting example of how a UE may be structured with some possible functional entities such as modules, circuits or units, to bring about the above-described functionality of the UE, is illustrated by the block diagram in FIG. 7. In this figure, the UE 700 is operable to apply a first table configuration in a radio communication with a serving radio node 702 of a cellular network, the first table configuration comprising at least one of a first Modulation and Coding Scheme, MCS, table and a first Channel Quality Indicator, CQI, table wherein the at least one of the first MCS table and the first CQI table support a certain maximum modulation order.

The UE 700 may be configured to operate according to any of the examples and embodiments of employing the solution as described above and as follows. In particular, the UE 700 may comprise means arranged or configured to perform the actions of the flow chart in FIG. 6. In order to put any of this into practice, the UE 700 may be implemented with a communication circuit C, a memory M and an operable processor P comprising various functional units as described below.

More specifically, the UE 700 comprises means, such as a communication unit 700a, configured to receive an instruction from the radio node 702 to apply a second table configuration in the radio communication, the second table configuration comprising at least one of a second MCS table and a second CQI table wherein the at least one of the second MCS table and the second CQI table support a higher modulation order which is higher than the maximum modulation order of the first table configuration. The UE 700 also comprises means, such as a logic unit 700b, configured to apply the second table configuration in the radio communication with the radio node 702. This is illustrated in the figure by the UE 700 receiving MCS signaling from the radio node 702 with reference to the second MCS table and/or sending CQI reports to the radio node 702, with reference to the second CQI table in accordance with the second table configuration.

It should be noted that FIGS. 5 and 7 illustrate various functional units in the radio node 500 and the UE 700, respectively, and the skilled person is able to implement these functional units in practice using suitable software and hardware. Thus, the solution is generally not limited to the shown structures of the radio node 500 and the UE 700, and the functional units 500a-b and 700a-b may be configured to operate according to any of the features described in this disclosure, where appropriate.

The functional units 500a-b and 700a-b described above can be implemented in the radio node 500 and the UE 700, respectively, by means of program modules of a respective computer program comprising code means which, when run by the processor P in each node causes the radio node 500 and the UE 700 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the radio node 500 and the UE 700 in the form of a memory having a computer readable medium and being connected to the processor P. The computer program product or memory M in each of the radio node 500 and the UE 700 may thus comprise a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective radio node 500 and UE 700.

The solution described herein may be implemented in the respective radio node 500 and UE 700 by a computer program comprising instructions which, when executed on at least one processor, cause the at least one processor to carry out the actions according to any of the above embodiments. The solution may also be implemented at the respective radio node 500 and UE 700 in a carrier containing the above computer program, wherein the carrier is one of an electronic signal, optical signal, radio signal, or computer readable storage medium.

It will now be described in more detail how the first MCS and CQI tables shown in FIGS. 2 and 3 can be modified to create the second MCS and CQI tables, which is exemplified in the modified MCS table shown in FIG. 8 and in the modified CQI table shown in FIG. 9.

MCS Index Table

In an illustrative example, a first MCS table of the above-described first table configuration is used for downlink transmission to one UE, such as UE1 in FIG. 1, and for downlink transmission to another UE, such as UE2 in FIG. 1, a second MCS table of the above-described second table configuration is used.

In another illustrative example, the first MCS table is the current MCS table of the first table configuration in specification as shown in FIG. 2, and the second MCS table is a modified new MCS table of the second table configuration that supports a modulation order higher than the maximum modulation order supported by the first MCS table, i.e. the second MCS table contains entries for higher-order modulation. An example of a second MCS table is shown in FIG. 8 which has been modified from the first MCS table of FIG. 2.

In another illustrative example, the radio node can use either current MCS table or proposed alternative MCS table for DL transmission. In a further example, the information about the MCS table that is to be used may be part of a DCI message, in which case it typically applies to a single specific subframe, or it may be part of a Radio Resource Control, RRC message or a Medium Access Control, MAC message, in which case it typically applies until further notice.

In another illustrative example, the proposed MCS index table of the second table configuration may have 32+N rows where N≥0 is a non-negative integer. The columns of the table represent the same parameters as those of the MCS index table shown in FIG. 2, which include MCS index $I_{MCS}$, modulation order $Q_m$ and TBS index $I_{TBS}$. Each table row or entry, that corresponds to one MCS, is indexed by the MCS index $I_{MCS}$ and contains a particular combination of modulation order and TBS index.

In another illustrative example, in the proposed MCS index table of the second table configuration, M rows, i.e., M MCS indices may be used to indicate the MCSs including pairs of one higher-order modulation scheme and one TBS index, where M is a non-negative integer with M>N.

In another illustrative example, 32+N−M MCS entries in FIG. 2 may be re-used in the new MCS table of the second table configuration. In other words, M−N MCS entries in FIG. 2 are not included in the new MCS table.

The current TBS table in the specification is illustrated in Table 7.1.7.2.1-1 in the document called 3GPP TS 36.213 V11.2.0 (2013-04). In another example, the rows of TBS values corresponding to the TBS indices contained in said M−N MCSs may be removed from the TBS table of the first table configuration. Meanwhile, M new rows of TBS values corresponding to said M MCSs for higher-order modulation are added to said TBS table.

In a further illustrative example, when N=0, the new MCS table of the second table configuration may keep the same size as the MCS table in FIG. 2 and M MCSs for higher-order modulation in FIG. 8 replaces M MCSs in FIG. 2. In a further example, the lowest MCS, corresponding to MCS index 0, may be preserved or kept in the new MCS table of the second table configuration in FIG. 8. In a further example, the subsequent M lowest MCSs (corresponding to MCS indices 1 through M) are excluded in the new MCS table of the second table configuration. An example of such a new MCS table is shown in FIG. 8. Compared to FIG. 2, the MCSs with indices from 1 to 6 for modulation order 2 (QPSK) have been removed in FIG. 8, whereas the lowest MCS is preserved. Instead, 6 MCSs for modulation order 8 (256QAM) have been added to the MCS table in FIG. 8.

In order to create the TBS table of the second table configuration, rows of TBS values corresponding to the removed and added MCSs should be removed and added accordingly from and to the TBS table of the first table configuration. Other MCS entries are re-used in the new MCS table and the indices in this table are rearranged, i.e. renumbered, from beginning. FIG. 10 illustrates an example of a proposed TBS table of the second table configuration, table dimension is 27*110, with index 21-26 for 256QAM, corresponding to the table in FIG. 9, where "NV" denotes new values. For the example shown in FIG. 10, the rows with index 1-6 for QPSK are removed and 6 new rows of TBS values for 256QAM have been added at the end of the table. This new TBS table of the second table configuration shall be consistent with the TBS index in said new MCS table of the second table configuration.

FIG. 10 will now be explained in more detail. FIG. 10 shows the Transport Block Size table in the specification 36.213 Table 7.1.7.2.1-1. The transport block size, i.e. the number of bits carried by a transport block is determined by both adopted MCS and the number of pair of resource blocks which is denoted $N_{PRB}$ in the table. For each MCS index in the MCS table, there are 110 possible numbers of PRB, 1-110. This is why the TBS table has a size of 110 columns and 27 rows that correspond to different MCSs, although they are not one-to-one mappings to the MCS table. If new MCS indices are added for 256QAM, the TBS entries for 256QAM need also be calculated and specified. Hence, in the new MCS table, the new entries for 256QAM must contain the TBS indices for corresponding new TBS values.

In another illustrative example, the lowest MCS, i.e. the entry with MCS index 0 in the MCS table of the first table configuration shown in FIG. 2 may be re-used in the new MCS table of the second table configuration. This is to ensure that the communication between the radio node and UE works properly even when the radio link experiences very poor channel condition, which may be called a low SINR scenario or similar.

In another illustrative example, when the new MCS table of the second table configuration is in use and the entry for lowest MCS is selected for a transmission, this indicates that it is difficult to support higher-order modulation due to variation of channel quality, bad radio conditions or other issues, and that a more robust MCS is needed. Hence, the MCS table used in the next transmission may automatically fall back to the first MCS table of the first table configuration, which may without limitation be the MCS table of the current standard, which allows for selection of any of the entries of e.g. the lowest modulation order.

In another illustrative example, the MCS field in DCI may be extended by one or more bits to indicate the MCS index when N>0, that is, the new MCS table of the second table configuration may have more than 32 MCS indices. However, this expansion of the MCS table may require one or more extra bits in the DCI.

CQI Index Table

The design of the new, or second, CQI index table of the second table configuration is similar to that of the new, or second, MCS index table of the second table configuration.

In an illustrative example, a first CQI table of the first table configuration may be used for radio transmission from the first UE to the radio node, while in the radio transmission from the second UE to the radio node, a second CQI table of the second table configuration may be used, or vice versa.

In another illustrative example, said first CQI table and second CQI table are the current CQI table in specification and a modified CQI table that contains entries for higher-order modulation, respectively. An example of a second CQI table of the second table configuration is shown in FIG. 9 which has been modified from the first CQI table of the first table configuration in FIG. 3.

In another illustrative example, a UE can use either the current CQI table of the first table configuration or the new CQI table of the second table configuration for transmission. In further examples, the information about the CQI table that is to be used may be part of a UCI message or part of a RRC or MAC message.

In another illustrative example, the proposed CQI table of the second table configuration has 16+N rows where N≥0 is a non-negative integer. The columns of the new CQI table represent the same parameters as those of the CQI table shown in FIG. 3, which include CQI index, modulation form, code rate and efficiency. Each table row or entry, that is one CQI, is indexed by a CQI index and contains a particular combination of a modulation order and code rate. The value of efficiency is calculated based on modulation order and code rate.

In another illustrative example, in the proposed CQI index table of the second table configuration, M rows, i.e., M CQI indices are used to indicate the CQI including pairs of one higher-order modulation scheme, one coding rate and resultant efficiency value, where M is a non-negative integer with M>N. In a further embodiment, the coding rates for higher-order modulation are defined and added to the CQI table.

In another illustrative example, 16+N−M CQIs in FIG. 3 are re-used in the alternative CQI table of the second table configuration. In a further embodiment, when N=0, the new CQI table keeps the same size as the CQI table in FIG. 3 and M CQIs for higher-order modulation replaces M CQIs in FIG. 3.

In a further example, the lowest CQI corresponding to CQI index 1 is preserved in the new CQI table of the second table configuration. In a further embodiment, the subsequent M lowest [CQI's] *CQIs*, corresponding to CQI indices 2 through M+1, are excluded in the new CQI table of the second table configuration. An example of such an embodiment is provided in FIG. 9. Compared to FIG. 3, the CQIs with indices from 2 to 5 for modulation order 2 (QPSK) have been removed, whereas the lowest CQI is preserved. Instead, 4 CQIs for modulation order 8 (256QAM) have been added to the table in FIG. 9. Other CQIs are re-used in the table and their indices are rearranged.

As mentioned above, the lowest CQI, i.e. the entry with index 1 in FIG. 3, may be re-used in the new CQI table of the second table configuration. This is to ensure that the communication between the radio node and UE works properly even when the radio link experiences very poor channel condition.

In another illustrative example, when the new CQI table of the second table configuration is in use and the entry for lowest CQI is selected, this indicates that it is difficult to support higher-order modulation due to variation of channel quality or other issues. Hence, the CQI table used in next transmission may automatically fall back to the first CQI table of the first table configuration which may without limitation be the CQI table in the current standard.

In another illustrative example, the CQI field in uplink control signaling may be extended by one or more bits to indicate the CQI index when N>0, that is, the new CQI table has more than 16 [CQI's] *CQIs*. However, this expansion of the CQI table may require one or more extra bits in the DCI.

Potential Advantages

The embodiments described herein may have the following advantages:

The process of link adaptation in LTE systems may be enhanced to support higher-order modulation schemes in an efficient manner, which may significantly improve the spectral efficiency in a cellular network, particularly in high SINR or SNR scenarios.

At least one MCS entry, e.g. the lowest MCS entry with MCS index 0, in the MCS table and at least one CQI entry, e.g. the lowest CQI entry for the lowest coding rate of the lowest modulation order with CQI index 1, in the CQI table may be preserved from the first table configuration as a fallback in the second table configuration to ensure proper communication between the radio node and UE when the radio link experiences very poor channel condition.

The size of the current MCS table may be preserved, or minimally expanded.

The implementation effort in the radio node and UEs may be kept to a minimum by sharing the majority of the MCS/CQI entries in the first and second MCS/CQI tables, respectively.

The solution may be applied for both downlink and uplink transmissions.

While the solution has been described with reference to specific exemplary embodiments, the description is generally only intended to illustrate the inventive concept and should not be taken as limiting the scope of the solution. For example, the terms "radio node", "User Equipment, UE", "table configuration", and "modulation order" have been used throughout this description, although any other corresponding entities, functions, and/or parameters could also be used having the features and characteristics described here. The solution is defined by the appended claims.

ABBREVIATIONS

LTE long-term evolution
PDSCH physical downlink shared channel
MCS modulation and coding scheme
eNB E-UTRAN NodeB
UE user equipment
CQI channel-quality indicator
QPSK quadrature phase-shift keying
16QAM 16 quadrature amplitude modulation
64QAM 64 quadrature amplitude modulation
SINR signal-to-interference-and-noise ratio
DCI downlink control information
GSM global system for mobile communications
WCDMA wideband code-division multiple access
WiMAX worldwide interoperability for microwave access
UMB ultra mobile broadband

What is claimed is:

[1. A method performed by a radio node of a cellular network, the radio node being operable to apply a first table configuration in radio communications with User Equipments (UEs), the first table configuration comprising at least one of a first Modulation and Coding Scheme (MCS) table and a first Channel Quality Indicator (CQI) table, wherein the at least one of the first MCS table and the first CQI table support a certain maximum modulation order, the method comprising:

detecting that a higher modulation order, which is higher than the maximum modulation order of the first table configuration, is potentially possible to use in a radio communication between the radio node and a first UE; and instructing the first UE to apply a second table configuration in the radio communication, the second table configuration comprising at least one of a second MCS table and a second CQI table, wherein a lowest modulation order of the first table configuration is maintained in the at least one of the second MCS table and the second CQI table as a fallback in case it is desirable to use the lowest modulation order of the first table configuration when the second table configuration is applied.]

[2. The method of claim 1, wherein the radio node instructs the first UE to apply the second table configuration in the radio communication between the radio node and the first UE when a performance related parameter of signals communicated between the radio node and the first UE is above a threshold.]

[3. The method of claim 2, wherein the radio node instructs a second UE to apply the first table configuration in a radio communication between the radio node and the second UE when the performance related parameter of signals communicated between the radio node and the second UE is below the threshold.]

[4. The method of claim 3, wherein the radio node instructs the second UE by sending an instruction to the second UE to apply the first table configuration, or by not sending an instruction to the second UE to apply the second table configuration.]

[5. The method of claim 1, wherein the at least one of the second MCS table and the second CQI table is a modification of the at least one of the first MCS table and the first CQI table, respectively; where a set of entries have been added for the higher modulation order and a set of entries for at least one modulation order in the at least one of the first MCS table and the first CQI table have been removed.]

[6. The method of claim 5, wherein the number of added entries for the higher modulation order and the number of removed entries for the at least one modulation order in the at least one of the first MCS table and the first CQI table are equal such that the first and second MCS tables are of equal size and/or the first and second CQI tables are of equal size.]

[7. The method of claim 1, wherein the at least one of the second MCS table and the second CQI table support the higher modulation order.]

[8. The method of claim 1, wherein the lowest modulation order in the first MCS table is maintained in the second MCS table as fallback, and a lowest coding rate of the lowest modulation order in the first CQI table is maintained in the second CQI table as fallback.]

[9. The method of claim 1, wherein the at least one of the second MCS table and the second CQI table is a modification of the at least one of the first MCS table and the first CQI table, respectively, where all entries of the at least one of the first MCS table and the first CQI table have been maintained in the at least one of the second MCS table and the second CQI table and a set of entries for the higher modulation order have been added.]

[10. The method of claim 1, wherein the first and second table configurations further comprise a Transport Block Size table corresponding to the first and second MCS tables, respectively.]

[11. A radio node of a cellular network, the radio node being operable to apply a first table configuration in radio communications with User Equipments (UEs), the first table configuration comprising at least one of a first Modulation and Coding Scheme (MCS) table and a first Channel Quality Indicator (CQI) table, wherein the at least one of the first MCS table and the first CQI table support a certain maximum modulation order, the radio node comprising:

one or more processing circuits configured to function as:

a logic circuit configured to detect that a higher modulation order, which is higher than the maximum modulation order of the first table configuration, is potentially possible to use in a radio communication between the radio node and a first UE; and an instructing circuit configured to instruct the first UE to apply a second table configuration in the radio communication, the second table configuration comprising at least one of a second MCS table and a second CQI table;

wherein a lowest modulation order of the first table configuration is maintained in the at least one of the second MCS table and the second CQI table as a fallback in case it is desirable to use the lowest modulation order of the first table configuration when the second table configuration is applied.]

[12. The radio node of claim 11, wherein the radio node is configured to instruct the first UE to apply the second table configuration in the radio communication between the radio node and the first UE when a performance related parameter of signals communicated between the radio node and the first UE is above a threshold.]

[13. The radio node of claim 12, wherein the radio node is configured to instruct a second UE to apply the first table configuration in a radio communication between the radio node and the second UE when the performance related parameter of signals communicated between the radio node and the second UE is below the threshold.]

[14. The radio node of claim 13, wherein the radio node is configured to instruct the second UE by sending an instruction to the second UE to apply the first table configuration, or by not sending an instruction to the second UE to apply the second table configuration.]

[15. The radio node of claim 11, wherein the at least one of the second MCS table and the second CQI table is a modification of the at least one of the first MCS table and the first CQI table, respectively, where a set of entries have been added for the higher modulation order and a set of entries for at least one modulation order in the at least one of the first MCS table and the first CQI table have been removed.]

[16. The radio node of claim 15, wherein the number of added entries for the higher modulation order and the number of removed entries for the at least one modulation order in the at least one of the first MOS table and the first CQI table are equal such that the first and second MCS tables are of equal size and/or the first and second CQI tables are of equal size.]

[17. The radio node of claim 11, wherein the at least one of the second MCS table and the second CQI table support the higher modulation order.]

[18. The radio node of claim 11, wherein the lowest modulation order in the first MCS table is maintained in the second MCS table as fallback, and a lowest coding rate of the lowest modulation order in the first CQI table is maintained in the second CQI table as fallback.]

[19. The radio node of claim 11, wherein the at least one of the second MCS table and the second CQI table is a modification of the at least one of the first MCS table and the first CQI table, respectively, where all entries of the at least one of the first MCS table and the first CQI table have been maintained in the at least one of the second MCS table and the second CQI table and a set of entries for the higher modulation order have been added.]

[20. A method performed by a User Equipment (UE), the UE being operable to apply a first table configuration in a radio communication with a radio node of a cellular network, the first table configuration comprising at least one of a first Modulation and Coding Scheme (MCS) table and a first Channel Quality indicator (CU) table, wherein the at least one of the first MCS table and the first CQI table support a certain maximum modulation order, the method comprising:

receiving an instruction from the radio node to apply a second table configuration in the radio communication, the second table configuration comprising at least one of a second MCS table and a second CQI table, wherein the at least one of the second MCS table and the second CQI table support a higher modulation order which is higher than the maximum modulation order of the first table configuration; and applying the second table configuration in the radio communication with the radio node, wherein a lowest modulation order of the first table configuration is maintained in the at least one of the second MCS table and the second CQI table as a fallback in case it is desirable to use the lowest modulation order of the first table configuration when the second table configuration is applied.]

[21. A User Equipment (UE), the UE being operable to apply a first table configuration in a radio communication with a radio node of a cellular network, the first table configuration comprising at least one of a first Modulation and Coding Scheme (MCS) table and a first Channel Quality Indicator (CQI) table, wherein the at least one of the first MCS table and the first CQI table support a certain maximum modulation order, the UE comprising:

one or more processing circuits configured to function as:

a communication circuit configured to receive an instruction from the radio node to apply a second table configuration in the radio communication, the second table configuration comprising at least one of a second MCS table and a second CQI table, wherein the at least one of the second MCS table and the second CQI table support a higher modulation order which is higher than the maximum modulation order of the first table configuration; and a logic circuit configured to apply the second table configuration in the radio communication with the radio node, wherein a lowest modulation order of the first table configuration is maintained in the at least one of the second MOS table and the second CQI table as a fallback in case it is desirable to use the lowest modulation order of the first table configuration when the second table configuration is applied.]

*22. A method performed by a radio node of a cellular network, the radio node being operable to apply a first Modulation and Coding Scheme (MCS) table of a first table configuration, the method comprising:*

*detecting that a higher modulation order, which is higher than a maximum modulation order of the first MCS table, is possible to use in a radio communication between the radio node and a first UE; and*

*instructing the first UE to apply a second MCS table of a second table configuration in the radio communication, wherein the second MCS table supports the higher modulation order;*

*wherein a table row in the first MCS table and a table row in the second MCS table both contain a same combination of lowest modulation order and Transport Block Size (TBS) index, and wherein the table row in the first MCS table and the table row in the second MCS table are both indexed by a lowest MCS index of the lowest modulation order; and*

*wherein use of the lowest MCS index of the lowest modulation order when the second table configuration is applied indicates that a MCS table used in a next transmission falls back to the first MCS table of the first table configuration.*

*23. The method of claim 22, wherein the radio node instructs the first UE to apply the second MCS table in the radio communication between the radio node and the first UE when a performance related parameter of signals communicated between the radio node and the first UE is above a threshold.*

*24. The method of claim 23, wherein the radio node instructs a second UE to apply the first MCS table in a radio communication between the radio node and the second UE when the performance related parameter of signals communicated between the radio node and the second UE is below the threshold.*

*25. The method of claim 22, wherein the first and second MCS tables correspond to respective Transport Block Size (TBS) tables.*

*26. The method of claim 22, wherein the lowest MCS index is MCS index 0.*

*27. A radio node of a cellular network, the radio node being operable to apply a first Modulation and Coding Scheme (MCS) table of a first table configuration, the radio node comprising:*

*one or more processing circuits configured to function as:*

*a logic circuit configured to detect that a higher modulation order, which is higher than a maximum modulation order of the first MCS table, is possible to use in a radio communication between the radio node and a first UE; and*

*an instructing circuit configured to instruct the first UE to apply a second MCS table of a second table configuration in the radio communication, wherein the second MCS table supports the higher modulation order;*

*wherein a table row in the first MCS table and a table row in the second MCS table both contain a same combination of lowest modulation order and Transport Block Size (TBS) index, and wherein the table row in the first MCS table and the table row in the second MCS table are both indexed by a lowest MCS index of the lowest modulation order; and*

*wherein use of the lowest MCS index of the lowest modulation order when the second table configuration is applied indicates that a MCS table used in a next transmission falls back to the first MCS table of the first table configuration.*

*28. The radio node of claim 27, wherein the radio node is configured to instruct the first UE to apply the second MCS table in the radio communication between the radio node and the first UE when a performance related parameter of signals communicated between the radio node and the first UE is above a threshold.*

*29. The radio node of claim 28, wherein the radio node is configured to instruct a second UE to apply the first MCS table in a radio communication between the radio node and the second UE when the performance related parameter of signals communicated between the radio node and the second UE is below the threshold.*

*30. The radio node of claim 27, wherein the lowest MCS index is MCS index 0.*

*31. A method performed by a User Equipment (UE), the UE being operable to apply a first Modulation and Coding Scheme (MCS) table of a first table configuration in a radio communication with a radio node of a cellular network, the method comprising:*

*receiving an instruction from the radio node to apply a second MCS table of a second table configuration in the radio communication, wherein the second MCS table supports a higher modulation order which is higher than a maximum modulation order of the first MCS table;*

*applying the second MCS table in the radio communication with the radio node;*

*wherein a table row in the first MCS table and a table row in the second MCS table both contain a same combination of lowest modulation order and Transport Block Size (TBS) index, and wherein the table row in the first MCS table and the table row in the second MCS table are both indexed by a lowest MCS index of the lowest modulation order; and*

*wherein use of the lowest MCS index of the lowest modulation order when the second table configuration is applied indicates that a MCS table used in a next transmission falls back to the first MCS table of the first table configuration.*

*32. The method of claim 30, wherein the lowest MCS index is MCS index 0.*

*33. A User Equipment (UE), the UE being operable to apply a first Modulation and Coding Scheme (MCS) table of a first table configuration in a radio communication with a radio node of a cellular network, the UE comprising:*

*one or more processing circuits configured to function as:*

*a communication circuit configured to receive an instruction from the radio node to apply a second MCS table of a second table configuration in the radio communication, wherein the second MCS table supports a higher modulation order which is higher than a maximum modulation order of the first MCS table;*

*a logic circuit configured to apply the second MCS table in the radio communication with the radio node;*

*wherein a table row in the first MCS table and a table row in the second MCS table both contain a same combination of lowest modulation order and Transport Block Size (TBS) index, and wherein the table row in the first*

*MCS table and the table row in the second MCS table are both indexed by a lowest MCS index of the lowest modulation order; and*

*wherein use of the lowest MCS index of the lowest modulation order when the second table configuration is applied indicates that a MCS table used in a next transmission falls back to the first MCS table of the first table configuration.*

*34. The UE of claim 33, wherein the lowest MCS index is MCS index 0.*

*35. A method performed by a radio node of a cellular network, the radio node being operable to apply a first Channel Quality Indicator (CQI) table of a first table configuration, the method comprising:*

*detecting that a higher modulation order, which is higher than a maximum modulation order of the first CQI table, is possible to use in a radio communication between the radio node and a first UE; and*

*instructing the first UE to apply a second CQI table of a second table configuration in the radio communication, wherein the second CQI table supports the higher modulation order;*

*wherein a table row in the first CQI table and a table row in the second CQI table both contain a same combination of modulation scheme of a lowest modulation order and a lowest coding rate, and wherein the table row in the first CQI table and the table row in the second CQI table are both indexed by a lowest CQI index of the lowest modulation order; and*

*wherein indication of the lowest CQI index of the lowest modulation order when the second table configuration is applied indicates that a CQI table used in a next transmission falls back to the first CQI table of the first table configuration.*

*36. The method of claim 35, wherein the radio node instructs the first UE to apply the second CQI table in the radio communication between the radio node and the first UE when a performance related parameter of signals communicated between the radio node and the first UE is above a threshold.*

*37. The method of claim 36, wherein the radio node instructs a second UE to apply the first CQI table in a radio communication between the radio node and the second UE when the performance related parameter of signals communicated between the radio node and the second UE is below the threshold.*

*38. The method of claim 35, wherein the lowest CQI index is CQI index 1.*

*39. A radio node of a cellular network, the radio node being operable to apply a first Channel Quality Indicator (CQI) table of a first table configuration, the radio node comprising:*

*one or more processing circuits configured to function as:*

*a logic circuit configured to detect that a higher modulation order, which is higher than a maximum modulation order of the first CQI table, is possible to use in a radio communication between the radio node and a first UE; and*

*an instructing circuit configured to instruct the first UE to apply a second CQI table of a second table configuration in the radio communication, wherein the second CQI table supports the higher modulation order;*

*wherein a table row in the first CQI table and a table row in the second CQI table both contain a same combination of modulation scheme of a lowest modulation order and a lowest coding rate, and wherein the table row in the first CQI table and the table row in the second CQI table are both indexed by a lowest CQI index of the lowest modulation order; and*

*wherein indication of the lowest CQI index of the lowest modulation order when the second table configuration is applied indicates that a CQI table used in a next transmission falls back to the first CQI table of the first table configuration.*

*40. The radio node of claim 39, wherein the radio node is configured to instruct the first UE to apply the second CQI table in the radio communication between the radio node and the first UE when a performance related parameter of signals communicated between the radio node and the first UE is above a threshold.*

*41. The radio node of claim 40, wherein the radio node is configured to instruct a second UE to apply the first CQI table in a radio communication between the radio node and the second UE when the performance related parameter of signals communicated between the radio node and the second UE is below the threshold.*

*42. The radio node of claim 39, wherein the lowest CQI index is CQI index 1.*

*43. A method performed by a User Equipment (UE), the UE being operable to apply a first Channel Quality Indicator (CQI) table of a first table configuration in a radio communication with a radio node of a cellular network, the method comprising:*

*receiving an instruction from the radio node to apply a second CQI table of a second table configuration in the radio communication, wherein the second CQI table supports a higher modulation order which is higher than a maximum modulation order of the first CQI table;*

*applying the second CQI table in the radio communication with the radio node;*

*wherein a table row in the first CQI table and a table row in the second CQI table both contain a same combination of modulation scheme of a lowest modulation order and a lowest coding rate, and wherein the table row in the first CQI table and the table row in the second CQI table are both indexed by a lowest CQI index of the lowest modulation order; and*

*wherein selection of the lowest CQI index of the lowest modulation order when the second table configuration is applied indicates that a CQI table used in a next transmission falls back to the first CQI table of the first table configuration.*

*44. The method of claim 43, wherein the lowest CQI index is CQI index 1.*

*45. A User Equipment (UE), the UE being operable to apply a first Channel Quality Indicator (CQI) table of a first table configuration in a radio communication with a radio node of a cellular network, the UE comprising:*

*one or more processing circuits configured to function as:*

*a communication circuit configured to receive an instruction from the radio node to apply a second CQI table of a second table configuration in the radio communication, wherein the second CQI table supports a higher modulation order which is higher than a maximum modulation order of the first CQI table; and*

*a logic circuit configured to apply the second CQI table in the radio communication with the radio node;*

*wherein a table row in the first CQI table and a table row in the second CQI table both contain a same combination of modulation scheme of a lowest modulation order and a lowest coding rate, and wherein the table*

*row in the first CQI table and the table row in the second CQI table are both indexed by a lowest CQI index of the lowest modulation order; and*

*wherein selection of the lowest CQI index of the lowest modulation order when the second table configuration is applied indicates that a CQI table used in a next transmission falls back to the first CQI table of the first table configuration.*

*46. The UE of claim 45, wherein the lowest CQI index is CQI index 1.*

* * * * *